INVENTORS
Russell R. Roberts
Jack P. Castellana
BY
D. D. McGraw
Their Attorney

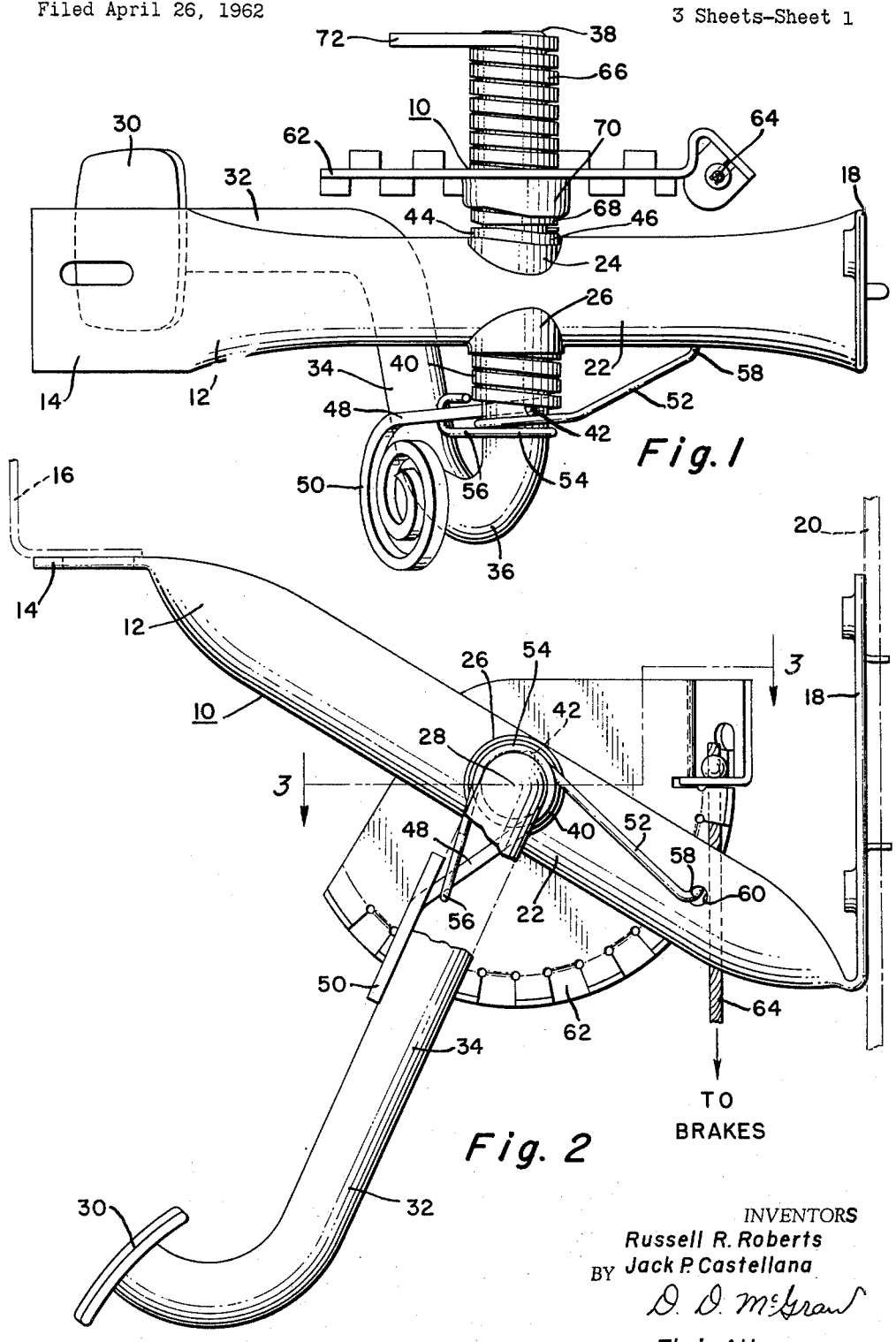

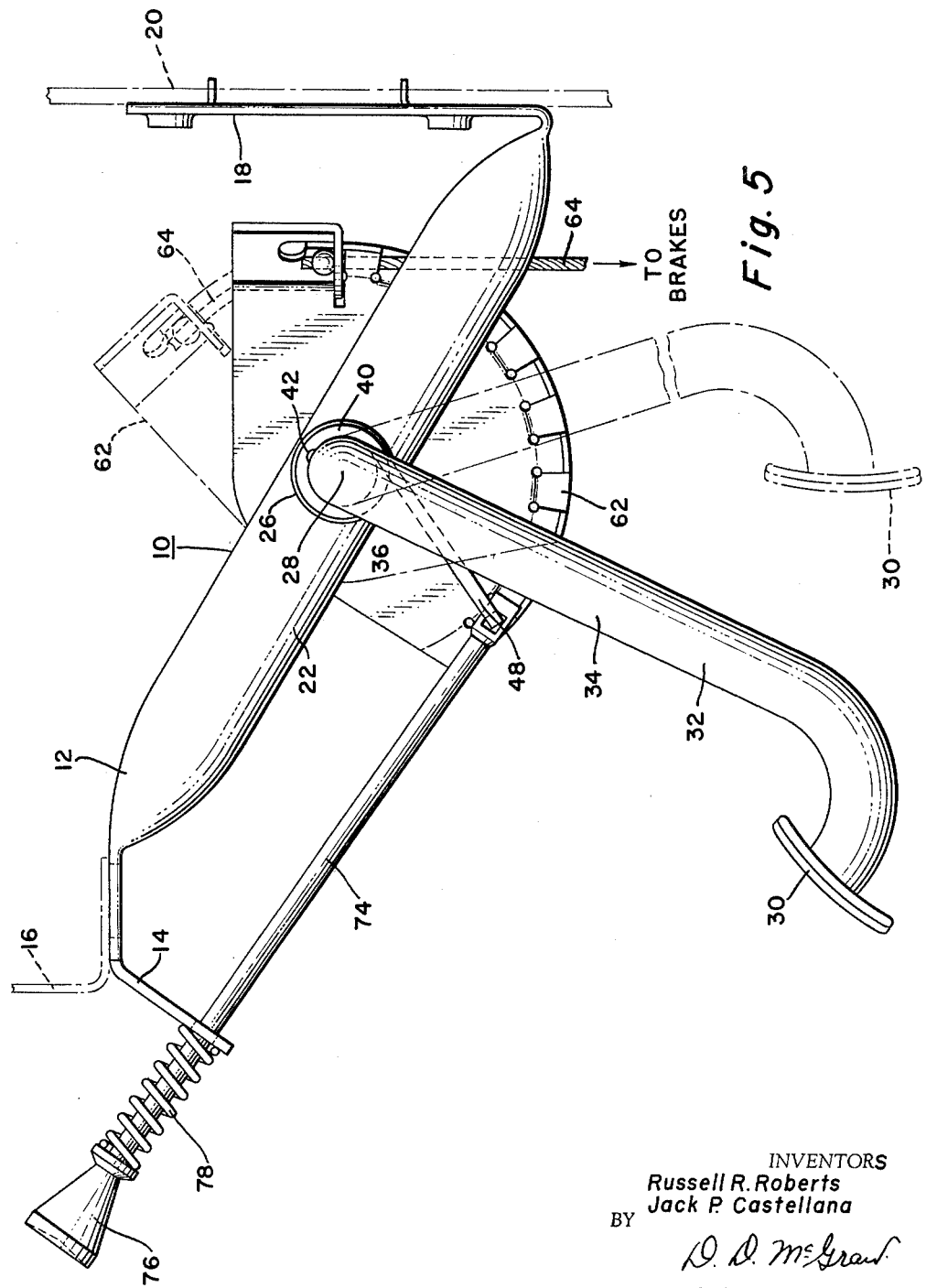

United States Patent Office 3,136,177
Patented June 9, 1964

3,136,177
BRAKE CONTROL MECHANISM
Russell R. Roberts, West Webster, and Jack P. Castellana, Churchville, N.Y., assignors to General Motors Corporation, Detroit, Mich., a corporation of Delaware
Filed Apr. 26, 1962, Ser. No. 190,349
7 Claims. (Cl. 74—531)

The invention relates to a parking brake control mechanism and more particularly to a mechanism which is silent in operation. The mechanism may be locked in the release position and in any desired brake apply position so as to mechanically hold the brakes of a vehicle in the applied position.

Automotive vehicles are commonly equipped with a mechanically actuated brake system which usually energizes the vehicle rear wheel brakes to hold them in the apply position while the vehicles are stopped. The brakes are also available for utilization at times as an emergency brake if the hydraulic brake system should fail to operate properly. It is desirable to have a brake actuating mechanism which is easy to operate and provides an infinite series of brake apply positions so that the brakes may be either slightly energized or fully energized or intermediately energized. It is also desirable to have such mechanisms operate quietly and release positively. Mechanisms of this type should be adjustable so that as the brake shoes wear the slack may be taken up in the brake actuating cable. Such mechanisms should also be economical to manufacture while maintaining a high degree of reliability. The brake may be either foot or hand actuable and is herein disclosed as being foot engaging. It is also desirable to have a foot release in some installations and to have a hand release in other installations. Two modifications of mechanisms embodying the invention are disclosed, one with a foot release and one with a hand release.

In order to obtain silent actuation and release it is now proposed to utilize a coil brake acting on a brake actuating shaft. When it is considered desirable to minimize the tolerance between the coil brake and the shaft it is also proposed to utilize a tolerance takeup device. The proposed brake mechanism may be easily manufactured from readily available materials and stock and fully utilizes mass production techniques wherein tubing and stampings are incorporated.

In the drawings:

FIGURE 1 is a plan view of a foot actuated and foot released mechanism embodying the invention.

FIGURE 2 is a side elevation of the mechanism of FIGURE 1 showing the mechanism in the brake release position.

FIGURE 5 is a side elevation of a modification of the mechanism of FIGURE 1 wherein the mechanism is provided with a hand release.

Figure 3:
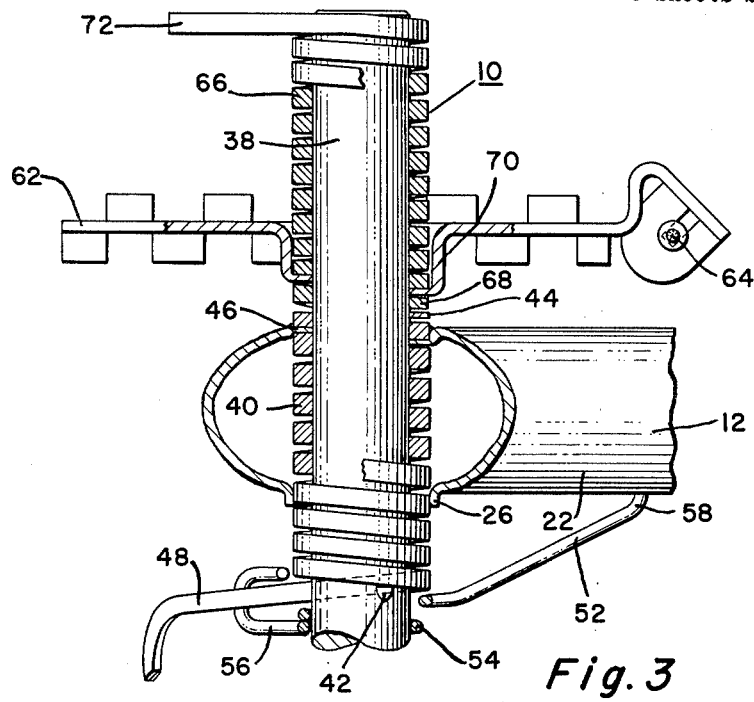
FIGURE 3 is a partial section view with parts broken away and taken in the direction of arrows 3—3 of FIGURE 2.
Figure 4:
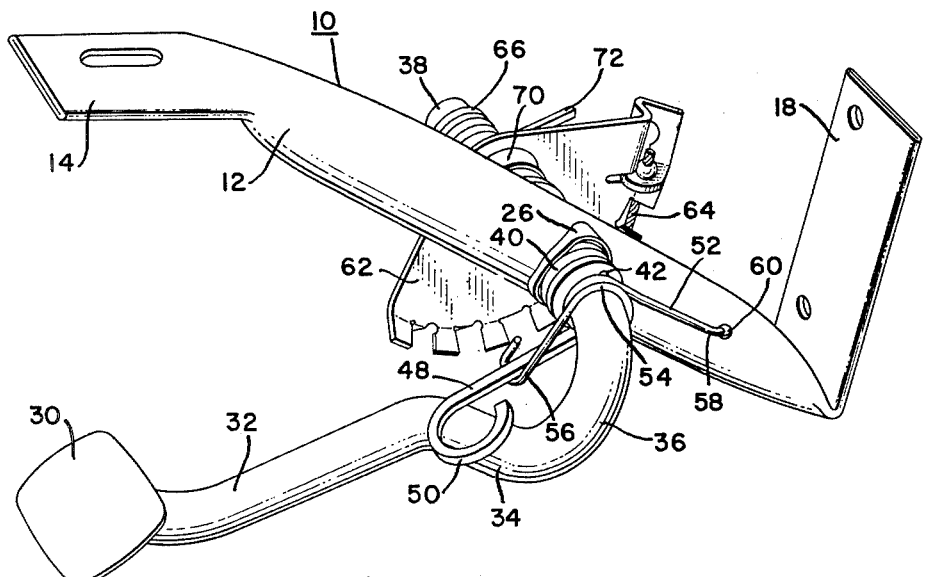
FIGURE 4 is a perspective view of the mechanism of FIGURE 1.

The parking brake actuating mechanism 10 illustrated in FIGURES 1-4 includes a mounting bracket 12 which is preferably formed as a tubular member with one end 14 being flattened and arranged to be attached to a suitable bracket 16 such as a part of the instrument panel of a vehicle. The other end 18 of mounting bracket 12 is suitably flattened and constructed so as to be attached to the vehicle firewall 20. In the usual left hand drive vehicle it is desirable to mount the mechanism 10 to the left of the vehicle operator immediately adjacent the side of the vehicle, as is well known in the art.

A suitable portion of the tubular section 22 of bracket 12 is provided with transversely extending cylindrical bearing surfaces 24 and 26. These surfaces may be formed from portions of the tubular section 22. The surfaces 24 and 26 have a common axis 28 which preferably extends substantially through the longitudinal axis of tubular section 22 and generally parallel to the ground when the mechanism 10 is mounted in a vehicle.

An apply pedal 30 is provided on the end of an arm 32. This arm has a center section 34 formed to extend generally underneath the tubular section 22 and to one side thereof. Arm 32 is then bent at 36 and has a shaft section 38 formed from the arm end opposite pedal 30. Shaft section 38 is of sufficient length to accommodate other portions of the mechanism to be described and has an axis which, when the shaft is installed in mounting bracket 12, is coincident with the bearing surface axis 28. A locking and releasing spring coil 40 is tightly wrapped about the portion of shaft section 38 adjacent bend 36. Shaft 38 is prevented from moving axially of coil 40 to a point wherein the shaft axis is no longer a straight line by provision of a stop 42. This stop may be an upset portion of the shaft section 38. It has been found to be mechanically feasible and economically practical to form arm 32 from a tubular member. Shaft section 38 would therefore be a tubular section having a straight axis. Arm 32 may also be formed from bar stock or other suitable material if desired.

Spring coil 40 is inserted through cylinder bearing surface 26 and has an end 44 which is threaded through a single convolution thread 46 formed in the outer end of the sheet metal forming bearing surface 24. The spring coil end 44 is then suitably secured to tubular section 22 by any suitable means such as hydrogen brazing the two assemblies and subsequently tempering the spring so that it regains its spring characteristics. This tempering operation also increases the strength of the attaching member. Spring coil 40 therefore extends entirely through tubular section 22 and has a free end 48. This end is located outwardly from bearing surface 26 and adjacent stop 42. The spring free end 48 may be formed to provide a foot release pedal 50. A suitable pad may be mounted on the pedal end of coil 40 if desired. The free end 48 of the coil 40 extends tangentially outward from the underside of the outer surface of shaft section 38 as is seen in the drawings. The internal diameter of coil 40 is somewhat smaller than the outer diameter of shaft 38 when the spring is in the free position. The spring coil 40 is preferably manufactured from rectangular stock to provide a greater surface area at the internal spring surface. In order to insert shaft section 38 in the spring coil, the spring free end 48 is moved downwardly in a direction to unwrap the coil, thus increasing the internal diameter of the coil and permitting easy insertion of the shaft section through the coil. When the coil free end 48 is released, the coil immediately wraps tightly about the shaft and grips it firmly.

It has also been found desirable under some circumstances to utilize a tolerance take-up spring 52 which cooperates to take up the internal diameter tolerance of coil 40 and assure its gripping action on shaft section 38. For this purpose a spring 52 may be provided. Spring 52 may be formed with a torsion section 54 through which shaft section 38 extends, with the torsion section being positioned outwardly of coil 40 in relation to mounting bracket 12. Spring 52 is provided with a hooked end 56 which engages the free end 48 of coil 40. The other end 58 of spring 52 is anchored to the mounting bracket 12 through the suitably provided aperture 60. The torsional section 54 of spring 52 is oppositely wound from that of coil 40 so that the spring ends 56 and 58 extend tangentially from top side of shaft section 38. It can be seen that the spring action of spring 52 will tend to lift the coil free end 48 thereby further tending to wrap coil 40 tightly about shaft section 38. This action takes up any tolerance between the inner diameter of the coil and the outer diameter of the shaft section.

Shaft section 38 also extends beyond the bearing surface 24 and the fixed end 44 of coil 40, and has a pulley 62 secured thereto. Pulley 62 is provided to actuate the parking brake cable 64 which in turn actuates the vehicle parking brakes. Cable 64 is normally in tension and tends to rotate pulley 62 in the clockwise direction as seen in FIGURE 2. This tension also tends to rotate shaft section 38 and arm 32 in the clockwise direction about the axis 28.

It has been found desirable to provide an adjusting mechanism for taking up the slack in cable 64 at a point adjacent the parking brake operating mechanism. A mechanism embodying the invention may therefore include structure accomplishing this result. This structure includes the locking and adjusting spring coil 66 which is wrapped about the end of shaft section 38 extending beyond bearing surface 24. The free internal diameter of coil 66 is preferably smaller than the external diameter of shaft section 38 so that the coil is normally locked tightly to the shaft. One spring coil end 68 is fixed to pulley 62 immediately adjacent the fixed end 44 of coil 40. Pulley 62 may be formed with a boss 70 having a single thread formed therein in which coil end 68 is threaded. The coil may then be suitably secured to boss 70 by hydrogen brazing or some other means. If the securing operation includes an elevated temperature condition, the parts may be tempered after being secured together. Coil 66 is also provided with a free end 72 which extends tangentially outward from the coil and from the end of shaft section 38.

When it is desired to adjust the slack in cable 64, free end 72 of coil 66 is rotated so as to unwrap the coil sufficiently to release the coil, together with pulley 62, from shaft section 38. The pulley and the coil are then rotated until the desired tension is obtained in cable 64. Upon release of the coil end 72 the coil immediately wraps tightly about and firmly grips shaft section 38, effectively locking pulley 62 to the end of the shaft section in the adjusted position.

The mechanism is shown in FIGURES 1–4 while it is in the brake release position. In order to apply the brake the vehicle operator pushes against pedal 30 to rotate arm 32 counterclockwise, as seen in FIGURE 2, about the shaft section axis 28. Since coil 66 is tightly locked to the shaft section, and the resistance to such movement of the shaft section by cable 64 of the pulley 62 tends to more tightly wrap coil 66 about the shaft, pulley 62 remains fixed relative to the shaft section 38 and therefore rotates with it in the counterclockwise direction about axis 28. Cable 64 is further tensioned, applying the vehicle parking brakes in an amount commensurate with the movement of arm 32. The counterclockwise rotation of shaft section 38 is permitted by coil 40 since such rotational movement of the shaft section tends to unwind coil 40, therefore causing the coil to release shaft section 38. When the operator removes his foot from pedal 30, the tension in cable 64 will act through pulley 62 and coil 66 and try to rotate shaft section 38 and arm 32 in the clockwise direction. This movement causes coil 40 to wrap more tightly about shaft 38 and to lock the mechanism in the brake apply position. Tolerance take-up spring 52 also acts on coil 40 and tends to wrap it more tightly about shaft 38, further increasing the locking action.

When it is desired to release the mechanism, the vehicle operator pushes the foot release pedal 50, which rotates the free end 48 of coil 40 so as to unwrap that coil from shaft section 38 until the shaft is no longer locked. The brake tension in cable 64 then rotates the pulley 62 and, through coil 66, shaft section 38 and arm 32 in the clockwise direction toward the brake release position. The arm 32 will return to the position shown in FIGURE 2 until it either fully relieves the tension in cable 64 or until its center section 34 engages the free end 48 of coil 40. If the foot release pedal 50 is released by the operator it can be seen that any tension remaining in cable 64 will act through arm center section 34 on the spring free end 48 and prevent further clockwise movement of the arm 32 by wrapping coil 40 more tightly about the shaft section 38. This engaging feature of arm center section 34 with the coil free end 48 is generally not required but is provided as a safety feature.

The modification shown in FIGURE 5 is generally similar to the structure illustrated in FIGURES 1–4 with the exception that a hand release is provided and a different tolerance take-up spring is also utilized. In this modification the coil free end 48 is attached to a rod 74 extending through a suitable aperture in the mounting bracket end 14 and to a convenient position for operation by the vehicle operator. Rod 74 is provided with a push knob 76. A spring 78 urges rod 74 and knob 76 outwardly. The spring therefore also acts on coil free end 48 and tends to wrap the coil more tightly about the shaft section 38 as does the tolerance take-up spring 52 of the first modification. When the vehicle operator desires to release the parking brake from the apply position indicated by the dashed lines of arm 32 and pedal 30, he pushes knob 76 to overcome spring 78 and rotate coil free end 48 in the counterclockwise direction. This unwinds coil 40 sufficiently to release the grip of the coil from shaft section 38 and permit the parking brakes to be released.

Other brake release mechanisms may be utilized if desired. By way of example, servos which are electrically or vacuum operated may be used to release the mechanism by controlled movement of the free end 48 of coil 40. The mechanism may also be modified to provide a hand actuation instead of foot pedal actuation.

The disclosed embodiments of the invention provide a quiet and smoothly operating device for actuating a vehicle parking brake system. The unit is positive in action, is easily released and applied, and is economical to manufacture.

We claim:

1. In a vehicle parking brake control mechanism, a mounting bracket, a pedal arm having a shaft attached thereto and rotatably mounted on said mounting bracket, a lock and release coil spring having one end thereof fixed to said mounting bracket and the body thereof wrapped about said shaft and normally gripping said shaft in locking relation and the other end thereof being free, an output member, means adjustably securing said output member to said shaft and including a coiled adjusting spring having one end fixed to said output member and a body portion coiled about said shaft in normal gripping relation thereto and a free end movable to uncoil said adjusting spring sufficiently to permit adjustment of said output member relative to said shaft, and means for connecting said output member to a vehicle parking brake system.

2. The mechanism of claim 1, said lock and release coil spring having a take-up spring operatively attached to the free end thereof and to said mounting bracket and urging said lock and release coil spring free end in a direction to wrap said lock and release coil spring more tightly about said shaft.

3. The mechanism of claim 1, said mounting bracket having bearing surfaces formed thereon in a transverse direction relative to said bracket and receiving said lock and release coil spring thereon about said shaft, and a threaded connection formed at the outer end of one of said bearing surfaces receiving said lock and release coil spring fixed end in threaded relation, and means permanently attaching said lock and release spring coil fixed end to said threaded connection.

4. A brake actuating and releasing mechanism comprising, a mounting bracket having tubular section and transversely extending cylindrically formed bearing sections on opposite sides thereof providing a cylindrical passage through said bracket tubular section, a lock and release coil spring extending through said bearing surfaces and having one end in screw connection and permanently secured relation with the outer end of one of said bearing surfaces and having a coiled body portion extending through said mounting bracket and having a free end, a pedal arm having a shaft thereon, said shaft extending through said lock and release coil spring and said mounting bracket and having an external diameter greater than the free internal diameter of said lock and reelase coil spring whereby said spring is normally in locking relation to said shaft, a pulley mounted on said shaft and having a brake actuating cable attached thereto, and means adjustably mounting said pulley on said shaft including a coiled adjusting spring having a free internal diameter smaller than the external diameter of said shaft and receiving said shaft therethrough whereby said shaft is normally locked to said pulley through said coiled adjusting spring, said adjusting spring having one end fixed to said pulley and a coiled body portion and a free end movable to release said shaft.

5. A control mechanism comprising, a mounting bracket, an input shaft rotatably received in said bracket, coil spring means having one end thereof fixed to said bracket and the other end thereof being free, said coil spring means being received about said shaft and normally gripping said shaft to lock said shaft nonrotatably in relation to said bracket in one direction of shaft rotation, an output member having means operatively securing it to said shaft to move rotatably therewith, and a tolerance take-up spring for taking up any tolerance between said coil spring means and said shaft when said coil spring means is in the shaft locking position, said take-up spring being operatively attached to said coil spring means free end and to said mounting bracket, said free end of said coil spring means being movable to open said coil spring means and release said shaft from said mounting bracket to permit said shaft to be rotated in the other direction.

6. The mechanism of claim 5, said means operatively securing said output member to said shaft including a coil adjusting spring having one end fixed to said output member and a free end and a spring body wrapped in tightly gripping relation about said shaft, said adjusting spring free end being movable to release the gripping action of said adjusting spring and permitting adjustment of said output member relative to said shaft.

7. The mechanism of claim 5, said input shaft having an actuating arm secured thereto and including an arm section in planar alignment with said coil spring means free end and engageable therewith upon a predetermined rotatable movement of said shaft in said other direction so that further movement of said shaft in said other direction applies a force urging said coil spring means free end to move said free end in a direction to lock said coil spring means to said shaft and prevent further rotatable movement of said shaft in said other direction.

References Cited in the file of this patent
UNITED STATES PATENTS

| | | |
|---|---|---|
| 60,509 | Hanley | Dec. 18, 1866 |
| 3,069,764 | Swats et al. | Dec. 25, 1962 |